(12) United States Patent
Rupp

(10) Patent No.: US 8,019,655 B2
(45) Date of Patent: Sep. 13, 2011

(54) METHOD AND COMPUTER SYSTEM FOR PROVIDING SPARE PARTS FOR A CLIENT

(75) Inventor: Viktor Rupp, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1149 days.

(21) Appl. No.: 10/577,317

(22) PCT Filed: Oct. 28, 2004

(86) PCT No.: PCT/EP2004/052697
§ 371 (c)(1),
(2), (4) Date: May 21, 2007

(87) PCT Pub. No.: WO2005/043425
PCT Pub. Date: May 12, 2005

(65) Prior Publication Data
US 2007/0282709 A1    Dec. 6, 2007

(30) Foreign Application Priority Data

Oct. 31, 2003  (DE) .................... 103 51 318
Apr. 13, 2004  (DE) .................. 10 2004 017 851

(51) Int. Cl.
*G06Q 30/00* (2006.01)
*G06Q 10/00* (2006.01)
(52) U.S. Cl. .................... 705/26.41; 705/26.1; 705/27.1; 705/28

(58) Field of Classification Search .................... 705/26, 705/27, 26.1, 26.41, 26.8, 26.81, 27.1, 28
See application file for complete search history.

(56) References Cited

U.S. PATENT DOCUMENTS

| | | | | |
|---|---|---|---|---|
| 6,249,772 B1 * | 6/2001 | Walker et al. | ................... | 705/26 |
| 6,601,043 B1 * | 7/2003 | Purcell | ............................ | 705/26 |
| 7,376,599 B1 * | 5/2008 | Gerhardt | ........................ | 705/27 |
| 2002/0103727 A1 * | 8/2002 | Tait et al. | ........................ | 705/28 |
| 2005/0065858 A1 * | 3/2005 | Tenzer et al. | .................... | 705/26 |

FOREIGN PATENT DOCUMENTS

| | | | |
|---|---|---|---|
| EP | 0986016 A1 * | 3/2000 | |
| EP | 1 288 803 A1 | 3/2003 | |
| FR | 2819076 | 7/2002 | |
| WO | 9849639 A1 | 11/1998 | |
| WO | WO-02/073492 A1 * | 9/2002 | |

OTHER PUBLICATIONS

Pele, C.E., "The New Webtopia," Nonwovens Industry, vol. 32, No. 3, p. 52, Mar. 2001.*

Kim, J.-S., "On the Benefits of Inventory-Pooling in Production-Inventory Systems," Manufacturing & Service Operations Management, vol. 4, No. 1, p. 12, Winter 2002.*

* cited by examiner

*Primary Examiner* — Nicholas D Rosen

(57) ABSTRACT

The invention relates to a method for providing spare parts for a client, wherein the method involves the following steps: collecting spare parts offers from spare parts suppliers, storing said spare part offers in the form of a list in a databank, visualizing said list for a spare parts client, the spare parts client selects a spare part from said list, purchasing the spare part from the spare parts supplier, selling said spare part to the spare parts client.

17 Claims, 5 Drawing Sheets

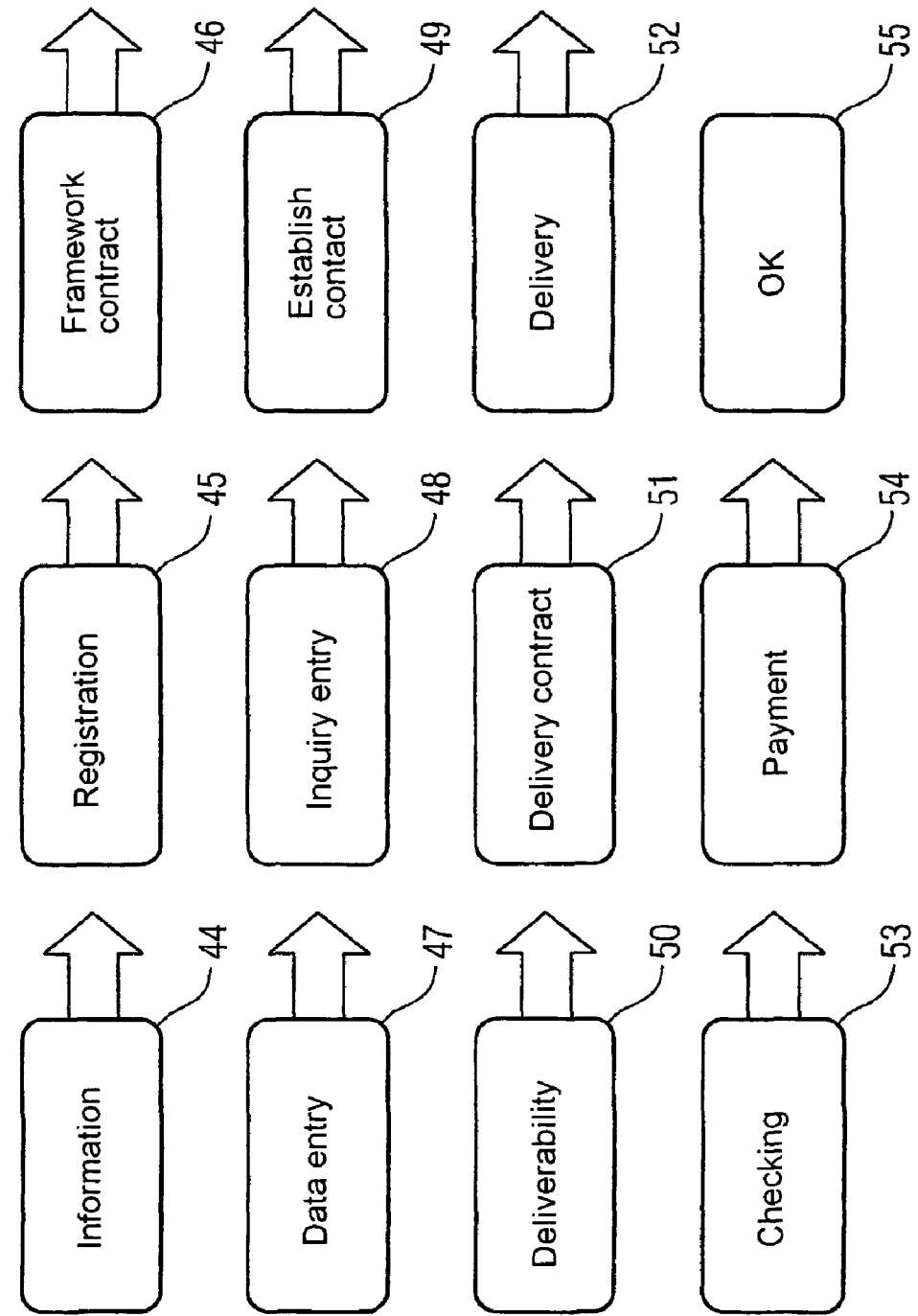

METHOD AND COMPUTER SYSTEM FOR PROVIDING SPARE PARTS FOR A CLIENT

CROSS REFERENCE TO RELATED APPLICATIONS

This application is the US National Stage of International Application No. PCT/EP2004/052697, filed Oct. 28, 2004 and claims the benefit thereof. The international Application claims the benefits of German application No. 10 2004 017 851.8 filed Apr. 13, 2004 and German application No. 10351318.3 filed Oct. 31, 2003. All of the applications are incorporated by reference herein in their entirety.

FIELD OF THE INVENTION

The invention relates to a method for providing spare parts for a client and to a computer system for executing this method.

BACKGROUND OF THE INVENTION

In many countries, for example in the Russian Federation, an almost closed national economic area continues to exist. Since all imported goods are subject to customs procedures the resulting delivery times for spare parts which have to be obtained from outside the country are long. As a result of the high average age of the production facilities in Russian industry the demand for spare parts is relatively high.

Providing and procuring spare parts is however problematic for a number of reasons. Many businesses are badly informed about their own stocks of spare parts so that greater quantities of spare parts than are actually needed to meet demand are stocked. In many large concerns the high administrative outlay of the ordering processes leads to excessive quantities being ordered. The disadvantage here is that capital is bound in by unnecessarily high stocks of spare parts. There are however also businesses which are forced as part of money saving measures to stock smaller amounts of spare parts. In this case the problem can occur of a missing spare part leading to a machine or system shutdown which results in losses caused by production downtimes.

SUMMARY OF THE INVENTION

The problem underlying the invention is thus that of specifying a computer system suitable for executing this method by which businesses and plants, referred to below as clients, can be provided with spare parts in an improved manner.

To resolve this problem a method is provided in accordance with the claims of the invention for providing spare parts for a client. In addition this problem is resolved by a computer system in accordance with the claims.

There is provision in the inventive method for spare parts offers from suppliers of spare parts to be collected, with these spare parts offers being stored in the form of a list in a database. The method further makes provision for this list to be visualized for a spare parts client who can select at least one spare part from this list. The purchase of the spare part from the supplier as well as the sale of this spare part to the spare parts client are provided as a further method step.

The database used with the inventive method represents a virtual warehouse or a pool for spare parts. The invention allows businesses and plants as spare parts suppliers to participate in this virtual warehouse for spare parts. Since the inventive method is executed by an operator, both the spare parts supplier and also the spare parts client can remain anonymous. This anonymity is above all important for competing businesses.

The invention provides the advantage of allowing spare parts clients to reduce their own spare parts stocks and therefore enables them to save money. Since there is access to the large virtual pool the delivery times for spare parts can be kept short. Out-of-date and difficult-to-procure spare parts can be procured rapidly and therefore downtimes for machines or plants kept low or even avoided altogether. Furthermore the client can administer his spare parts completely within the system which is above all a requirement with a number of sites which are not close to each other. This means that the part is searched for in one's own plants before being purchased; often it exists in a neighboring plant. The major advantage also emerges that the administration overhead for a spare parts client or a spare parts supplier is extremely small which means that additional costs can be saved.

It is especially preferred that the execution of the method and the administration of the computer system be undertaken by a service provider as operator. The service provider can advantageously also be a manufacturer of industrial components at the same time.

The operator of the method, especially the service provider, can provide some or all of the necessary logistics steps from a single source, e.g. the setting up and operation of the computer system, the registration of new clients, the preparation and the conclusion of contracts, the organization of transport of the spare parts, the handling of the payments etc.

The inventive method can be executed especially easily if it is handled via a computer network such as the Internet. In this case there can also be provision for spare parts suppliers and/or spare parts clients to use a central Internet page, especially an Internet portal.

The primary candidates for spare parts suppliers are companies with businesses and plants which purchase spare parts for their machines and systems from a manufacturer and use them in production facility or the plant. Accordingly the suppliers of spare parts are primarily not manufacturers of spare parts for these production devices such as machines and apparatus but instead the spare parts suppliers buy the spare parts from a manufacturer for the purposes of keeping stocks of spare parts for their production equipment.

For the spare parts clients and the spare parts suppliers the advantage of this is that they obtain with the invention a complete solution for spare parts procurement and spare parts purchase from a single source.

In a further embodiment of the invention there can be provision for a number of databases to be used, with each database being assigned to an economic area. In this way the method can also be used across economic boundaries. In this case a number of databases are accessed to create the visualized list. The spare parts client thus has the opportunity of also ordering spare parts abroad without the bureaucracy.

To further increase the convenience for the purchaser of spare parts there can be provision for a list selected in accordance with the selection criteria to be output once these criteria have been entered. In this way the relevant spare parts offers can be selected and delimited in accordance with different selection criteria.

An alternative embodiment of the method makes provision for own offers of a spare parts supplier to be presented on the visualized list of the spare parts offers in a way in which they can be recognized visually. The presentation can in this case be arranged sorted in accordance with connected companies or companies consisting of a number of businesses in order to co-ordinate individual operating states within the database explicitly. It is thus possible to recognize own spare parts on the visualized list easily.

An especially unbureaucratic method emerges if the operator of the method organizes the transport of a purchased spare part. With this variant there is no requirement for the spare parts supplier or the spare parts purchaser to deal with the details of the organization of transport. A further simplification of handling spare parts orders can be obtained if the operator of the method checks the viability of a purchased spare part. The purchaser of a spare part can then be sure that the spare part has the properties promised by the spare parts supplier and is technically in order.

The invention further relates to a computer system for providing spare parts for a client with a server database for storing a list of spare parts, a Web page for entry of a spare part and an associated purchase price in the list by a first client, a Web page for selecting and ordering a spare part from this list by a second client, means for transferring the purchase price of the spare part to an account of a user of the first client and means for debiting an account of a user of the second client with the amount of the order.

Alternatively other means for handling of the payment traffic can also be provided such as payment by direct debit, by credit card or by Internet payment systems.

Preferably the inventive computer system can feature a number of server databases with each database being assigned to an economic area. A user can have the visualized list created on the basis of a number of server databases so that he can access a larger stock of spare parts. Furthermore he can have a personally selected list of the spare parts offered created by entering selection criteria.

It is also especially useful for the inventive computer system to include a demonstration mode for the individual functions. New clients are thus given the opportunity of finding out about the different functions and of trying out these functions.

The inventive computer system can comprise means for downloading a contract form and/or for concluding a contract electronically. In this way the overall handling of the selling and purchasing processes can be undertaken electronically.

BRIEF DESCRIPTION OF THE DRAWINGS

Further advantages and details of the invention are explained on the basis of an especially suitable exemplary embodiment with reference to the drawings. The drawings are schematic diagrams and show:

FIG. 5 a flowchart of an offering process (sale).

DETAILED DESCRIPTION OF THE INVENTION

Figure 1:
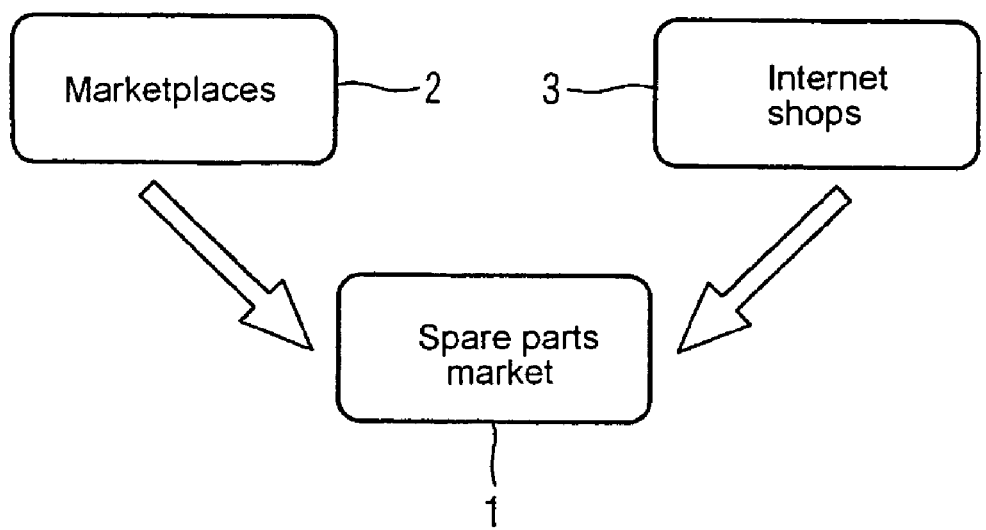
FIG. 1 the positioning of the Internet platform of the inventive method in the Internet.

FIG. 1 shows the positioning of the Internet platform in the Internet of a country or of an economic area. The database via which the spare parts can be purchased and sold is designated in FIG. 1 as the spare parts market. The spare parts market 1 is connected via links to other marketplaces 2 in the Internet and to other Internet shops 3. These cross-references allow potential client to easily find the spare parts market 1 in the Internet.

Figure 2:
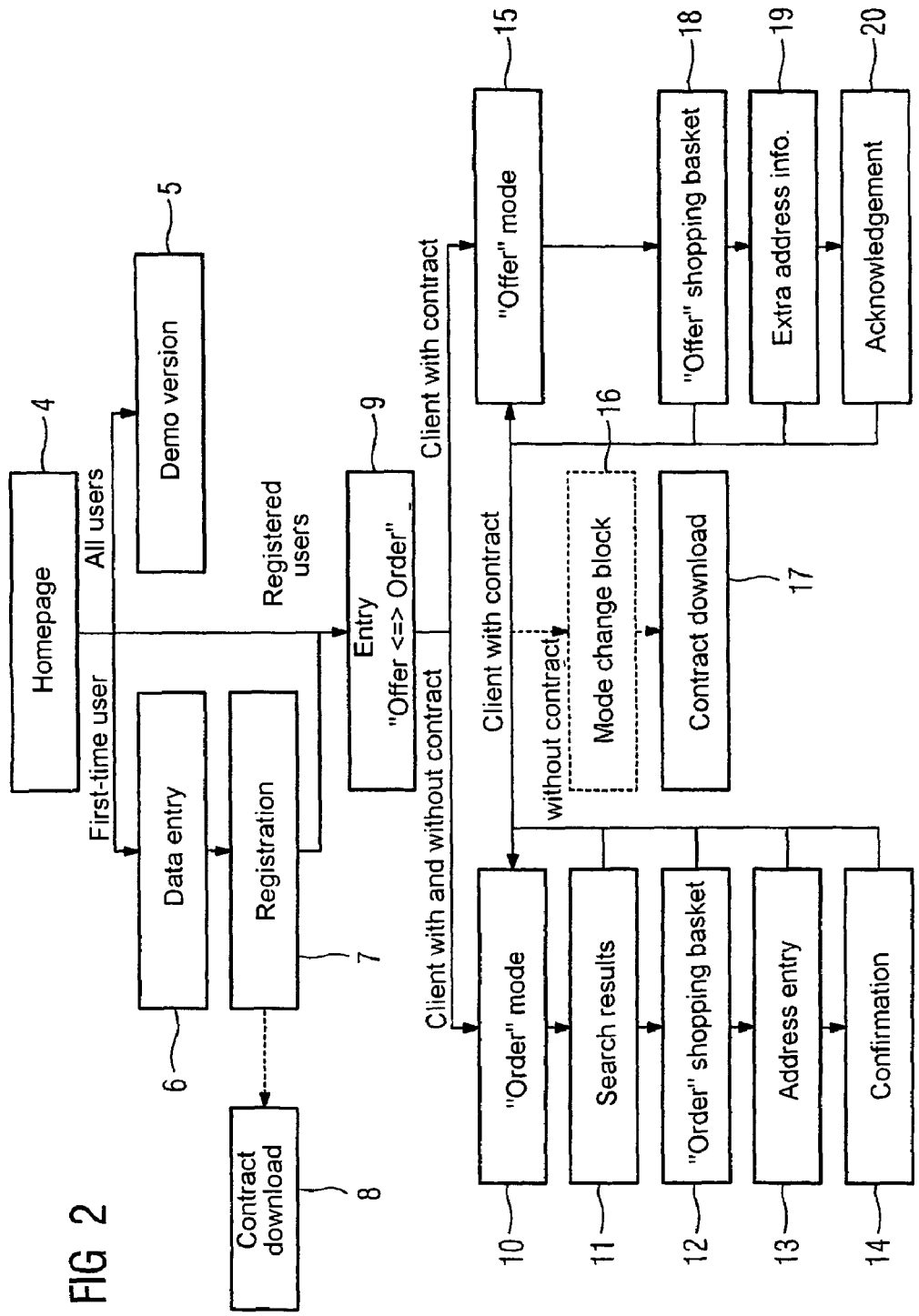
FIG. 2 the structure of the Internet pages of the inventive method.

FIG. 2 shows the structure of the Internet pages of the method. If a user has selected the entry page (home page 4) he can find out on the basis of a demo version 5 about all the important functions of the spare parts database. A user arriving at the home page 4 for the first time can transfer his client data by making a data entry 6 and undertaking the registration 7 necessary for using the database. This includes the download 8 of contract forms.

An already registered user can move from the home page directly to an entry page 9 on which he can choose between the alternatives "offer" and "order".

The mode "order" 10 can be selected by clients with and without a contract. The client is then provided with a search function so that he can use a search mask and the entry of selection criteria such as the order number to select one of more articles offered. The search results 11 are displayed to the client, who can select them and thereby place them in a shopping basket 12 for the order. Subsequently—if this differs from the registration address—the ordering party enters their address 13. The required documentation of the order process is generated automatically and the ordering party receives an acknowledgement 14 of their order.

A client who has already concluded a contract with the operator of the database can change to the "offer" mode 15. If the user has not yet concluded a contract the mode change block 16 comes into effect and the user is asked to perform the required contract download 17. The "offer" mode is only enabled after the contract download is signed.

In the "offer" mode 15 the user is provided with an offer mask so that he can enter the desired spare parts and their technical data. The input can be facilitated by enabling the data of the spare parts offered to be entered in the format of conventional office software such as Excel (registered trade mark).

The articles entered are stored in the shopping basket "offer" 18. The supplier also has the opportunity of changing existing offers, e.g. of supplementing the description or of changing the price. After the article is entered the address of the supplier is entered if necessary in step 19, finally the supplier receives a confirmation of all the data entered. Each offer contains an automatic expiry date, e.g. in three months. Two weeks before expiry the supplier receives a message that the offer has to be extended. If it is not extended the offer is deleted so that details are guaranteed to be up to date. The updating can also be extended any number of times by three months at any time beforehand.

The method also contains an administration tool which is only visible for administrators and enables the data to be processed. In this way the client and spare parts database can be linked to various functions.

Figure 3:
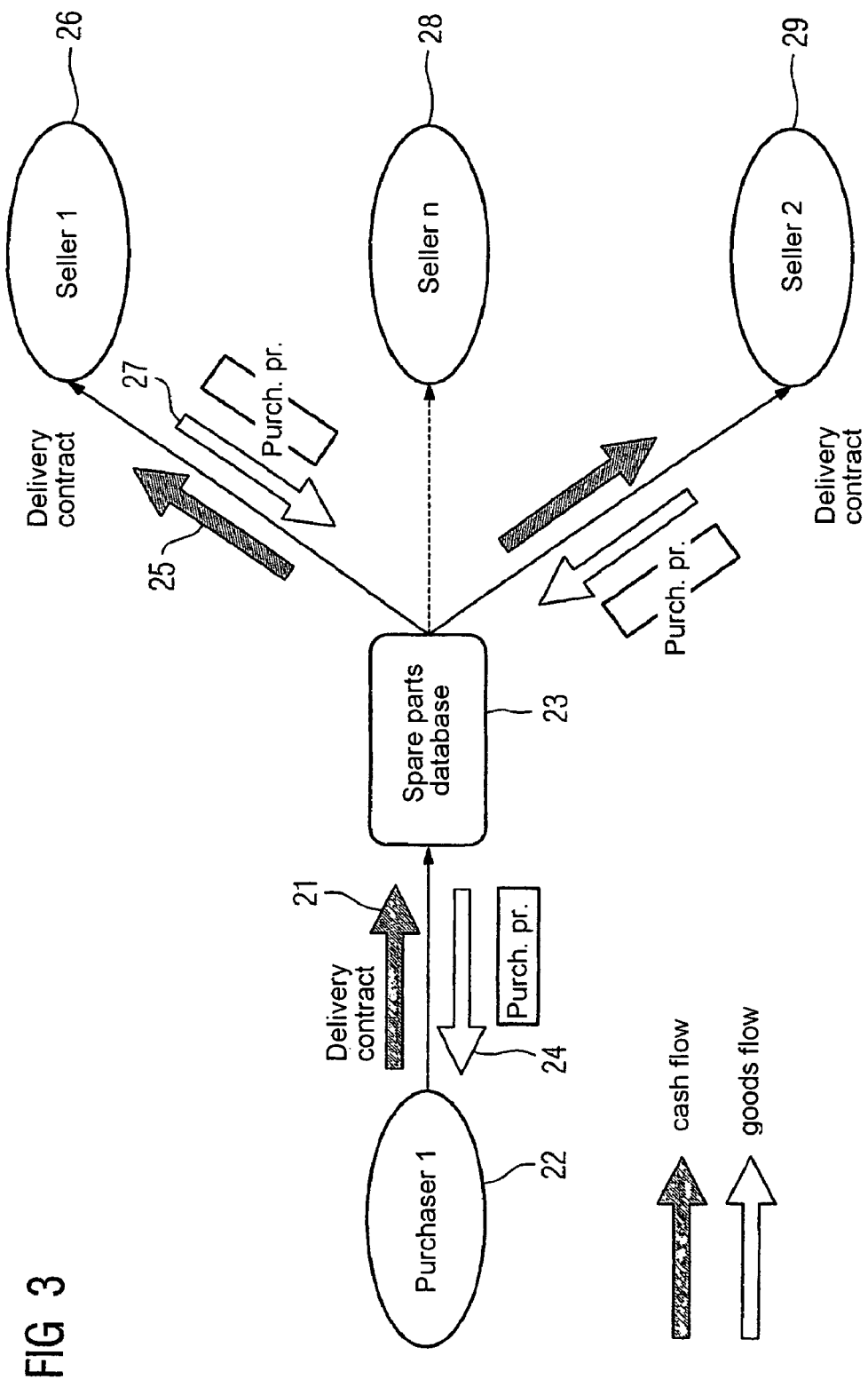
FIG. 3 a presentation of the contractual relationships between the purchaser, the operator of the database and the sellers.

FIG. 3 shows a diagram of the contractual relationships between the purchaser, the operator of the database and the sellers.

Since different legal requirements for Internet marketplaces exist in different countries, the method for providing spare parts will be restricted to a specific closed economic area, e.g. the Russian Federation. The "purchase-spare parts service provider-sale model" is used for this economic area.

As shown in FIG. 3, a purchase or delivery contract 21 between a seller 22 and the operator of the method and of the spare part database 23 is concluded. On conclusion of the purchase contract 21 the purchase price 2 to be paid by the purchaser 22 is simultaneously agreed.

For his part, the operator of the spare parts database 23 concludes a purchase and delivery contract 25 with a seller 26, with the delivery contract 25 also providing for agreement on a selling price 27. The operator of the spare parts database may if necessary conclude contracts for other spare parts with further sellers 28, 29. In practice the operator of the spare parts database concludes a plurality of contracts with buyers and sellers.

For an actual order the spare parts service provider obtains a spare part from a seller and checks its viability if required to do so by the purchaser. After this check the spare part is sold on to the purchaser. The profit for the operator of the method and the database is produced by the difference between the selling price and the purchase price. The spare parts service provider gives a guarantee of viability for a specific period, for example for the first two weeks after delivery, but does not give a long-term guarantee. Any claims for non-delivery are made on the seller. The method is executed so that the dispatch of a spare part to the purchaser is only undertaken once the purchase price has been paid in advance.

Figure 4:
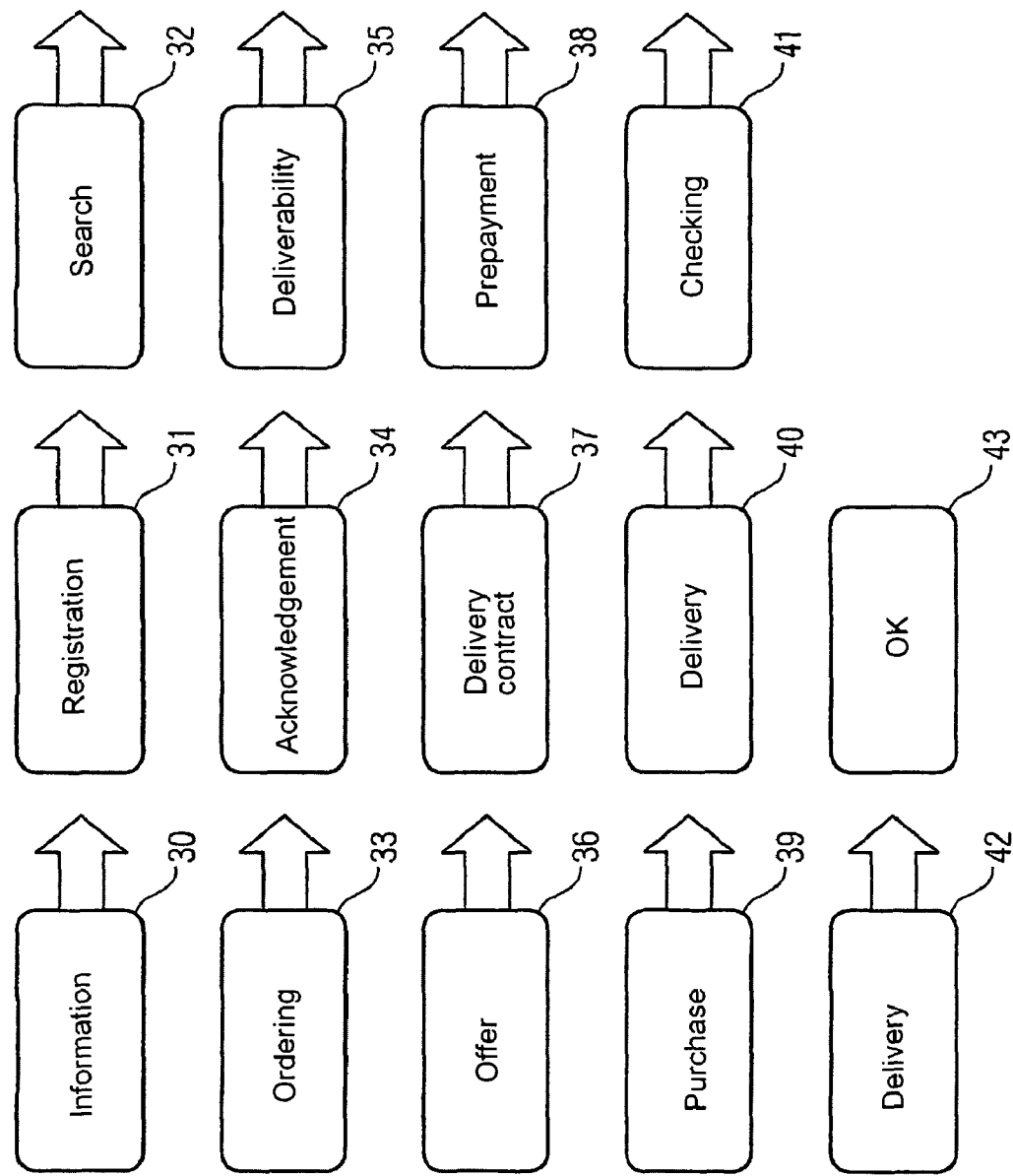
FIG. 4 a flowchart of an ordering process (purchase)

FIG. 4 shows a flowchart of an ordering process (purchase).

The ordering process begins with the information (30) about a potential client as shown in the left-hand field of the upper row. The further steps are to be read row-by-row from left to right. The information is followed by the registration (31) of the client, who can subsequently conduct a search (32) for the desired spare parts. Once he has found a desired spare part he can place an order (33), for this ordering process he receives an acknowledgement (34) from the operator of the database and of the method which includes information about deliverability (35). The client then receives a concrete offer (36), containing all the information required to conclude a contract. After the conclusion of the purchase or delivery contract (37) the purchaser is asked to pay for the spare parts ordered using a prepayment method (38). The operator of the method then initiates the purchase (39) of the ordered spare parts and the delivery (40) of the spare parts from the spare parts supplier to the operator. The operator optionally submits the spare parts at the request of the purchaser to a check (41) on their viability and subsequently initiates the delivery (42) to the purchaser, which brings the method to a conclusion (43).

FIG. 5 shows a flowchart of an offer process (sale).

After information (44) is supplied by a potential seller, the seller arrives at the registration (45) point and enters the required data. Subsequently he can download the text of a framework contract (46). After the contract is concluded the spare parts suppler can enter data (47) so that this data is registered in the database. If a potential spare parts purchaser wishes to purchase the spare part offered by this seller, the spare parts supplier receives an inquiry (48) from the operator of the database. The spare parts supplier can enter into a contract (49) with the database operator and transfer to him information about the deliverability (50) of the spare part or spare parts. If the delivery is possible, a purchase and delivery contract (51) between the spare parts supplier and the operator of the method is concluded and the operator organizes the delivery (52) from the spare parts supplier to the operator. A check (53) on the spare parts delivered is made there and the payment (54) of the purchase price is undertaken if the check on the spare parts has not revealed any deficiencies. This brings the offer and sale process to a conclusion (55).

The method for providing spare parts and the associated computer system make it possible to construct virtual warehouses on the basis of a database ("pooling"), with this type of warehouse being set up for different economic areas. For these more of less closed countries the method can be operated with comparable conditions.

If a number of national databases exist, orders and offers can be undertaken across economic boundaries, which is especially useful for old and rare spare parts. In this case either the party offering the spare parts or the operator of the method defines whether spare parts are offered solely in the own economic area or across economic boundaries.

The method described allows data to be filtered or extracted, with the data output being arranged in accordance with connected companies consisting of a number of businesses. This option is especially worthwhile for larger companies or concerns which have a number of spare parts stores. In this way individual stocks of spare parts within the system or the database can be explicitly coordinated, in addition a specific view or presentation option for own spare parts in the system is enabled.

The invention claimed is:

1. A computer-implemented method for providing spare parts for a client, comprising:
   receiving via a user interface a plurality of spare part offers from a plurality of spare part suppliers, wherein the spare part offers comprise spare parts and technical data from a spare part supplier's own inventory, and wherein the spare part offers are defined to be restricted to a specific economic area;
   compiling the collected spare part offers into a spare part list;
   storing the spare part list in a respective one of a plurality of virtual spare part warehouses restricted by the specific economic area, wherein each virtual spare part warehouse comprises a spare part supplier's own inventory and inventory of other spare part suppliers, wherein the other spare part suppliers include connected companies;
   receiving as part of an ordering process a search request for a spare part from a spare part client;
   searching the spare part list in accordance with the search request, wherein the search is conducted in a virtual spare part warehouse of a specific economic area for closed economies or across all virtual spare part warehouses for open economies;
   displaying results of the search request, wherein the displayed results comprise a specific view that identifies which of the displayed results correspond to the spare part client's own inventory and wherein the results are arranged in accordance with connected companies;
   receiving a selection of a spare part from the displayed results;
   processing payment for the spare part selected by the spare part client; and
   initiating purchasing of the spare part from the spare part supplier and delivery to the spare part client.

2. The method in accordance with claim 1, wherein the method is performed via an Internet page.

3. The method in accordance with claim 2, further comprising electronically processing a payment transaction for the purchase and sale of the spare parts.

4. The method in accordance with claim 3, wherein a sales contract is foamed between a selected spare parts supplier and a method operator at the conclusion of the electronic payment transaction.

5. The method in accordance with claim 4, wherein a purchase contract is formed between the method operator and the spare parts client at the conclusion of the electronic payment transaction.

6. The method in accordance with claim 1, wherein the displayed list is compiled via access to a number plurality of databases.

7. The method in accordance with claim 1, wherein the method operator organizes the transportation of the purchased spare part.

8. The method in accordance with claim 7, wherein a plurality of databases are used and each database is assigned to a respective economic area.

9. The method in accordance with claim 8, wherein the economic area is a country having a restricted and closed economy.

10. The method in accordance with claim 9, wherein the economic area is the Russian Federation.

11. A computer system for providing spare parts for a client, comprising:
- a server database comprising a plurality of virtual spare part warehouses for storing a list of spare parts in accordance with a defined economic area in which the spare parts are offered;
- a first user interface mode for receiving input of spare part offers from a plurality of spare part suppliers, wherein the spare part offers comprise spare parts and technical data from each spare part supplier's own inventory, and wherein the spare part offers are defined to be restricted to a specific economic area;
- a second user interface mode for selecting and ordering a spare part by a spare part client, wherein the second user interface mode is adapted to:
  (a) receive as part of an ordering process a search request for the spare part from the spare part client,
  (b) search the spare part list in accordance with the search request, wherein the search is conducted in a virtual spare part warehouse of a specific economic area for closed economies or across all virtual spare part warehouses for open economies,
  (c) display results of the search request, wherein the displayed results comprise a specific view that identifies which of the displayed results correspond to the spare part client's own inventory and wherein the results are arranged in accordance with connected companies,
  (d) receive a selection of the spare part from the displayed results, wherein the spare part is associated with an inventory of one of spare part suppliers having the part in stock;
- a transferer for processing payment for the spare part by transferring the purchase price of the spare part to an account of the one of spare part suppliers having the part in stock; and
- a debiter for debiting the payment from a user account of the spare part client.

12. The computer system in accordance with claim 11, further comprising a plurality of server databases, wherein each database is assigned to a respective economic area.

13. The computer system in accordance with claim 12, wherein the economic area is a country having a restricted and closed economy.

14. The computer system in accordance with claim 13, wherein the economic area is the Russian Federation.

15. The computer system in accordance with claim 11, further comprising a demonstration mode for demonstrating the individual functions of the system on a display to a new user.

16. The computer system in accordance with claim 15, wherein the second user interface mode is adapted to electronically download and execute a contract.

17. A method for providing spare parts for a client located in an import restricted and closed economic area, comprising:
- receiving via a user interface a plurality of spare part offers from a plurality of spare part suppliers, wherein the spare part offers comprise spare parts and technical data from each spare part supplier's own inventory, and wherein the spare part offers are defined to be restricted to a specific economic area;
- pooling the spare part offers into a spare part list;
- storing the spare part list in a respective one of a plurality of virtual spare part warehouses restricted by the specific economic area in a computerized database, wherein each virtual spare part warehouse comprises a spare part supplier's own inventory and inventory of other spare part suppliers, wherein the other spare part suppliers include connected companies;
- receiving as part of an ordering process a search request for a spare part from a spare part client;
- searching the spare part list in accordance with the search request, wherein the search is conducted in a virtual spare part warehouse of a specific economic area for closed economies or across all virtual spare part warehouses for open economies;
- displaying results of the search request, wherein the displayed results comprise a specific view that identifies which of the displayed results correspond to the spare part client's own inventory and wherein the results are arranged in accordance with connected companies;
- receiving a selection of a spare part from the displayed results;
- processing electronically a payment transaction for the purchase and sale of the spare parts by the spare part client;
- executing an electronic sales contract between the spare part supplier and the spare part client; and
- arranging transportation of the purchased spare part from the spare part supplier to the spare part client.

* * * * *